United States Patent Office 3,352,771
Patented Nov. 14, 1967

3,352,771
POLYMERIZATION OF HALO ACRYLATE MONOMERS USING ULTRAVIOLET LIGHT AND HYDROXY SUBSTITUTED BENZOPHENONE ABSORBERS
Harry D. Anspon, Kansas City, Mo., assignor to General Aniline & Film Corporation, New York, N.Y., a corporation of Delaware
No Drawing. Filed Mar. 17, 1964, Ser. No. 352,635
6 Claims. (Cl. 204—159.23)

ABSTRACT OF THE DISCLOSURE

Controls the polymerization rate of halo-acrylate monomers, such as methyl α-chloracrylate during irradiation to obtain uniformity in polymers of massive thickness by including with the monomer from 0.001 to 0.1% by weight of a hydroxy substituted benzophenone ultra violet light absorber, soluble in the monomer, for example, 2,2'-dihydroxy-4,4'-dimethoxybenzophenone.

---

The present invention relates to an improved method of controlling the polymerization rate in bulk polymerization. It has particular application to the polymerization of massive bodies of acrylate type resins, especially halo-acrylates, wherein the control of the reaction of polymerization rate is obtained by incorporating modifiers into the monomer. In other words, the modifiers are dispersed throughout the monomer prior to polymerization and are effective during the entire polymerization process.

In the preparation of halogen-containing acrylate polymers, generally, such as methyl alpha chloracrylate polymers, a process which is well known in the prior art, it has been found highly desirable, and in many cases absolutely necessary, to be able to control the polymerization rate to obtain certain properties such as uniformity of molecular weight, uniformity of strength, transparency, hardness, flexibility, etc. This is particularly important in polymerizing large bulky masses. An object of the present invention is to accomplish controlled polymerization in bulky masses by the simple addition to the monomer, prior to polymerization, of a relatively very small amount of a control agent. Preferably, the control agent is effective to moderate the rate at which radiation is received in depth into the monomer. In particular an agent is chosen which is absorptive of ultra violet light to such a degree as to slow down the polymerization and prevent, to a substantial degree, local heating or uneven growth in molecular weight. At the same time, the absorptive material must not altogether prevent penetration of the radiation so as to prevent the polymerization completely.

As well known in the art, polymers of the type under consideration, and particularly polymers of methyl alpha chloracrylate, generally have been prepared in the past, in relatively thin sheets, at least, by heating, or by incorporating a polymerization catalyst into the monomer, with or without heating, or, in some cases, by simple irradiation of the monomer without catalyst, preferably using ultra violet light for the irradiation. Some satisfactory sheet products have been prepared in these various ways but thick bulky castings, so prepared, are subject to certain undesirable variations in quality and in various physical characteristics such as transparency, uniformity of index of refraction, etc. It is highly desirable to be able to exercise careful control over the molecular weight among other things throughout the mass during polymerization. The molecular weight finally obtained should be uniform, or reasonably so throughout the whole mass. The speed of the polymerization reaction should not be so great at any point in the mass as to cause local overheating because such overheating produces flaws, weak spots, local opacity and the like.

In the preparation of bulky polymers, especially those of thick cross section of this general type, optical clarity is often a very important consideration. They are frequently used as windows in aircraft and as components of optical systems or at least as panels through which light may pass clearly. Polymerization accomplished by irradiation with ultra violet light has the advantage, over the other, methods named above, of avoiding the introduction of catalyst which must remain as residues and impurities and which tend to cause deterioration and other faults as the polymeric material ages in use. Moreover, products made by the ultra violet radiation method, if the reaction rate is properly controlled, generally are not subject to the types of non-uniformity which result from heating the monomeric material by conduction as in those processes where heat is employed.

When large masses of methyl alpha chloracrylate are prepared by the usual methods of irradiation with ultra violet light, greater difficulty has been encountered in the past than with sheet materials in obtaining high quality throughout. Apparently the degree or rate of polymerization, in various parts of the monomer, takes place at rates which differ considerably, particularly in larger masses. As a result, strains are introduced and other non-uniformities, particularly in light transmission qualities, arise in the products.

According to the present invention, the difficulties named above can largely be overcome by a careful control of the amount of radiation, particularly ultra violet radiation, which effectively penetrates into and causes polymerization of the monomeric mass. This can be controlled by the addition to the monomeric halo-acrylate of suitably proportioned small quantities of various ultra violet light absorbers, particularly those of phenolic type, and especially hydroxy phenols and phenones. Various other ultra violet absorbers doubtless may be used for some of the purposes of the present invention. Those which are based on benzoyl phenols or hydroxy benzophenone compounds are particularly satisfactory. In particular, materials such as benzoyl resorcinol or hydroxy alkoxy benzophenones are especially effective.

The general polymerization of monomeric alpha-halogen substituted acrylic compounds to yield colorless polymers is described in the prior art in such sources as U.S. Patents 2,548,091 and 2,434,229. Generally speaking, this process is concerned with casting sheets of the polymer, being accomplished by placing the monomer in a transparent mold where it can be irradiated. Such molds usually comprise two glass plates equipped with suitable edge seals. The monomer is exposed to the activating radiation, usually ultra violet. For thin sheets of polymer, the unmodified radiation by ultra violet light is often satisfactory though some absorption is often desirable. However, where the finished products are thick and heavy, the control of the rate of polymerization throughout becomes more urgent. An advantage of the present invention is that it makes it possible to slowly polymerize bulk castings and still obtain reasonably uniform molecular weigh and other properties throughout. Large masses of polymeric alpha halo-acrylate materials may thus be produced which would be difficult to polymerize without overheating if produced by conventional methods. The type of irregularities particularly to be avoided are those which give rise to strain, to undue light diffusion or distortion, and to many other defects. Bulk castings containing any of these defects tend to be weak structurally and to have relative poor service life when employed in positions where mechanical strength is of importance.

A particular feature of importance is the exposure to radiation which will be slowed but not entirely stopped by the absorber. Hence, assuming that the effective or principal band of radiation is in the absorbed range, it is usually desirable to have a somewhat broader spectrum of radiation so that at least marginal and partially effective rays may reach deeply into the monomeric mass. Thus, as an approximation, some 70 to 95% of the effective radiation should be absorbed but the remainder should be allowed to penetrate.

The invention is not limited to the polymerization of methyl alpha chloracrylate but is applicable also to related materials, such as the other halogenated acrylates and analogous and homologous materials. The important feature for control is to incorporate throughout the monomer a small quantity of material that will absorb ultra violet light, but only to absorb it to the extent required to slow down and control the polymerization rate. The ultra violet absorbers thus may be used in very small quantities, e.g. from 0.001% up to a maximum of about 0.1% by weight, based on the monomeric material. The absorbers must of course be soluble in the monomer and well distributed. Reference will next be made to specific examples.

EXAMPLE 1

Steam distilled methyl α-chloracrylate was chilled to −35° C. for a period of time sufficient to remove water therefrom by freezing. The monomer was then placed in a mold and polymerized by irradiation with a sun lamp having its principal light output at 3100 A. Polymerization occurred in 8 to 14 hours. The temperature was recorded throughout the polymerization by means of a thermocouple attached to the mold. This recorded a strong temperature peak during the polymerization.

By contrast, the same monomer was modified by adding thereto 0.05% by weight of a silicone resin, DC-550 (Dow Corning), as a mold release agent, and 0.05% of 2,2′-dihydroxy-4,4′-dimethoxy benzophenone as an ultra violet radiation absorber. Polymerization under the same light required several days but no perceptible temperature peak occurred. The untreated monomer produced a product with visible strain patterns. None were noted in the treated product.

EXAMPLE 2

Two clear glass bottles containing the same monomer and the same additives as in the second part of Example 1 were exposed to the same ultra violet radiation as in Example 1. The light source in each case was a Westinghouse fluorescent Sun Lamp, 40 watts, principal light output at 3100 A., at a distance of one foot. After exposure of 18 hours, no noticeable polymerization had taken place, indicating that the ultra violet absorber had prevented substantial penetration of the radiation into the body of the monomer.

Thereafter, one of the bottles was continued under exposure to the lamp (at a temperature of 35° C.) and the other was exposed to solar radiation on a cloudy day at a lower temperature (10° C.). After a few hours, the latter had polymerized completely whereas the material in the bottle exposed to the lamp was still liquid. This behavior indicated that the ultra violet absorber was not simply a polymerization inhibitor but that it effectively absorbed most of the narrow band radiation from the lamp in the first millimeters depth of monomer and thus prevented deeper polymerization activity. In the case of the bottle exposed to the daylight, on the other hand, it appears that radiation in wave lengths which were close to those that were absorbed were not completely stopped by the outer layers and penetrated so as to polymerize the monomer in depth. There are of course additional complex factors, such as total energy of incident light, monomer absorption of light, polymerizing efficiency of various wave lengths, etc. In this case, though, it appeared that the screening effect of the monomer and the absorber dissolved therein outweighed all the other factors. The net effect is that ultra violet absorbers which are soluble in the monomer can be added to control the polymerization rate without stopping it and by this means polymerization of relatively thick masses may be controlled to obtain the desired results.

Color stability in the halo-acrylate polymers is much better than in some other polymers, such as polyvinyl chloride, for example, but it is substantially improved when the polymerization rate is better controlled. After a year of exposure to weather in Florida, for example, the polymer changes in color to a very perceptible degree. After about 400 hours in a standard fadeometer, darkening becomes quite evident, especially when a thick sheet, for example, is viewed edgewise. Polymers containing the ultra violet absorber possessed greatly enhanced color stability. The original polymers containing such materials have a slightly yellow color, due to the absorber itself, but this does not increase appreciably after prolonged exposure to sunlight.

EXAMPLE 3

A mold of dimensions 30 x 30 x ¼ inches was filled with methyl α-chloracrylate containing 0.01% by weight of 2,2′-dihydroxy-4,4′-dimethoxy benzophenone. The mold was then irradiated with twelve lamps of the same type as used in Examples 1 and 2. Six lamps were used on each side of the glass plate mold, at a distance of 12 inches. Exposure was continued for 38 hours. After polymeriaztion was essentially complete, the mold was heated for 24 hours at 120° C.

EXAMPLE 4

Example 3 was substantially repeated except that 0.01% of benzoyl resorcinol was used in place of the 2,2′-dihydroxy-4,4′-dimethoxy benzophenone. The materials of both this and the preceding example were tested in the fadeometer and no darkening occurred after 400 hours exposure.

Agents of other types, which are absorptive of ultra violet radiation, such as 2-phenylindole and 2,3-diphenylindole were tested and found effective to regulate the polymerization rate in much the same manner as those described above. Other stable ultra violet absorbers include methyl umbelliferone, 2,2′,4,4′-tetrahydroxy-benzophenone, 2,2′,4-trihydroxy-4-methoxy benzophenone, and the like.

It will be understood that variations may be made in compositions and methods of using them, as will be obvious to those skilled in the art. It is intended by the claims which follow, to cover such obvious variations as far as the state of the prior art properly permits.

It will also be understood that by such expressions as "uniform degree" of polymerization, or "substantially uniform" molecular weight, and the like, in the claims, it is not intended to mean that molecular weight is absolutely or nearly absolutely unform throughout an entire mass. As a matter of fact, the molecular weight may safely be varied substantially, say, from the surface of a thick mass to its center. What is intended, rather, is a condition where there are no substantial local "hot" spots or relatively unpolymerized areas which made the material seriously discontinuous in structure or faulty or spotted in its major physical properties, such as transparency, strength in tension, compression, or shear, or its index of refraction, and the like.

What is claimed is:

1. Process for polymerizing halo-acrylate monomer to produce flaw-free massive polymeric structures, which comprises adding to the monomer 0.001 to 0.1% by weight of a hydroxy substituted benzophenone ultra violet absorber which is soluble therein, placing the monomer in a mold appropriate to the desired structure and transparent to radiation, and irradiating with ultra violet light having a spectrum such that 70 to 95% of the effective radiation is absorbed and the remainder penetrates entirely through the monomer, whereby polymerization to a substantially uniform degree throughout is obtained.

2. Process for making methyl α-chloracrylate polymer structures of massive thickness and of substantially uniform molecular weight throughout, which comprises adding to the monomer 0.001 to 0.1% by weight of a hydroxy substituted benzophenone ultra violet light absorber which is soluble in said monomer, placing the monomer in a transparent mold of the shape of the structure to be formed, and irradiating with ultra violet light which is of at least moderately broader spectrum than the absorbed frequency whereby about 70 to 95% of the effective radiation is absorbed and the remainder is transmitted to the interior of the polymer.

3. Process according to claim 1 wherein the absorber is 2,2'-dihydroxy-4,4'-dimethoxy benzophenone.

4. Process according to claim 1 wherein the absorber is benzoyl resorcinol.

5. Process according to claim 2 wherein the absorber is 2,2'-dihydroxy-4,4'-dimethoxy benzophenone.

6. Process according to claim 2 wherein the absorber is benzoyl resorcinol.

References Cited
UNITED STATES PATENTS

| | | | |
|---|---|---|---|
| 2,853,521 | 9/1958 | Hardy et al. | 260—591 |
| 2,900,361 | 8/1958 | Havens | 260—45.95 |

SAMUEL H. BLECH, *Primary Examiner.*

RICHARD TURER, *Assistant Examiner.*